United States Patent
Addison et al.

(10) Patent No.: US 8,739,136 B2
(45) Date of Patent: May 27, 2014

(54) VALIDATING RUN-TIME REFERENCES

(75) Inventors: Edward A. Addison, Raleigh, NC (US);
Peggy A. DeVal, Raleigh, NC (US);
Philip R. Lee, Hampshire (GB);
Andrew Wright, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/292,315

(22) Filed: Nov. 9, 2011

(65) Prior Publication Data
US 2012/0159457 A1    Jun. 21, 2012

(30) Foreign Application Priority Data

Dec. 16, 2010    (EP) ..................................... 10195481

(51) Int. Cl.
*G06F 9/44*    (2006.01)
(52) U.S. Cl.
USPC ......................................... 717/131; 717/126
(58) Field of Classification Search
None
See application file for complete search history.

(56) References Cited

U.S. PATENT DOCUMENTS

| | | | | | |
|---|---|---|---|---|---|
| 5,535,390 | A | * | 7/1996 | Hildebrandt | 711/154 |
| 5,764,883 | A | * | 6/1998 | Satterfield et al. | 714/38.1 |
| 5,909,580 | A | * | 6/1999 | Crelier et al. | 717/141 |
| 6,968,438 | B1 | * | 11/2005 | Russo et al. | 711/170 |
| 7,174,432 | B2 | * | 2/2007 | Howard et al. | 711/147 |
| 7,222,332 | B2 | * | 5/2007 | Gschwind et al. | 717/107 |
| 7,577,799 | B1 | * | 8/2009 | Howard et al. | 711/147 |
| 7,930,491 | B1 | * | 4/2011 | Xu et al. | 711/154 |
| 8,157,647 | B2 | * | 4/2012 | House et al. | 463/29 |
| 8,321,668 | B2 | * | 11/2012 | Leroy et al. | 713/167 |
| 2003/0188040 | A1 | * | 10/2003 | Vincent | 709/317 |
| 2005/0015753 | A1 | * | 1/2005 | Meijer et al. | 717/136 |
| 2005/0193217 | A1 | * | 9/2005 | Case et al. | 713/200 |

OTHER PUBLICATIONS

IP.Com Publication. Author: Anonymous. IP.com No. IPCOM000194941D, IP.com Electronic Publication: Apr. 14, 2010.*
Authors et. al.: Disclosed Anonymously, IP.com No. IPCOM000196346D, IP.com Electronic Publication: May 31, 2010.*
Authors et al.: Disclosed Anonymously, IP.com No. IPCOM000194941D, IP.com Electronic Publication: Apr. 14, 2010.*
Author: Anonymous; Date Apr. 14, 2012; Publication IP.com Prior Art Database Technical Disclosure ; Title: Avoidance of parameter list data loss when handling an error condition or gathering First Failure Data Capture information.
Written Opinion and International Search Report for PCT/EP2011/068680 dated Jan. 2, 2012.

* cited by examiner

*Primary Examiner* — Issac Tecklu
*Assistant Examiner* — Hossain Morshed
(74) *Attorney, Agent, or Firm* — Cantor Colburn LLP

(57) ABSTRACT

Identifying conflicting declared invalid runtime references of overlaid data structures of a shared memory area as declared in a program listing. The identifying includes identifying a first data structure and a first parameter list in the program listing. A first routine call and a sequential flow of execution of the first routine call through the program listing in order to write data to the shared memory area are identified. A second data structure and a second parameter list in the program listing are identified. A second routine call and a second sequential flow of execution of the second routine call through the program listing in order to write data to the shared memory area are identified. It is determined whether the second routine call is attempting to overwrite data of the first routine call with the data of the second routine call in the shared memory area.

20 Claims, 7 Drawing Sheets

Fig. 4

```
! Domain call parameter list storage.
dcl 1 xxyy_parms union bdy(dword),
     2 apex_parms  char(length(dfhapex_arg)),
     2 lmlm_parms  char(length(dfhlmlm_arg)),
     2 meme_parms  char(length(dfhmeme_arg)),
     2 smmc_parms  char(length(dfhsmmc_arg)),
     2 tswq_parms  char(length(dfhtswq_arg));
```

405 — (pointing to comment line)
410 — (bracket around dcl block)
400 — (bracket around entire listing)

VALIDATING RUN-TIME REFERENCES

PRIORITY

This application claims priority to European Patent Application No. 10195481.5, filed on 16 Dec. 2010, and all the benefits accruing therefrom under 35 U.S.C. §119, the contents of which in its entirety are herein incorporated by reference.

BACKGROUND

The invention relates to the field of application programming. In particular, the present invention relates to validating run-time references.

Large and complex systems, such as the IBM® CICS® transaction processing system, are composed of many thousands of separate and individual programs. (IBM and CICS are trademarks of International Business Machines Corporation, registered in many jurisdictions worldwide.) Each program includes source code, and the source code provides a certain type of functionality or service. In order to use this functionality, a program will make a call, invoke a function, send a message, or invoke methods against other classes (in an object orientated language) in or to the program that it needs to use.

In certain types of applications, programs are grouped into domains. A domain is a collection of programs designed to provide a particular function such as storage management or locking, for example. A domain is akin to a class in object orientated languages. Each domain provides a gate which allows other domains to invoke its services.

In order for a program to make a call to another program, a program includes declarations (references) to data structures and parameter lists which are used to invoke gates within another domain. Parameter lists are typically declared within a section near the start of a program and define the different types of parameters, options, response, and reason code fields, etc. which allow the code to make a call to other domains at runtime. These declarations include the parameter list storage area that is set up at run-time, prior to making a call to another domain, and populated upon the return from a domain call, with the various response and reason codes from a called routine within a program.

Often, programs are termed as 'single threaded', meaning that there is only a single thread of control running through a program at any one time. This also means that at any point in time, only one set of parameter storage is being used to handle the invocation to another domain.

It is common practice to declare different parameter list areas as overlaying each other. In a programming language, such as PLX, for example, this is achieved by defining the parameter lists as a 'union' of data structures, all mapping to the same starting point within a program's working storage. The 'union' is declared as the maximum memory size for the largest of all the parameter list areas. The advantage of this approach is that it simplifies the mapping of a program's working storage and reduces the need for larger program stack areas.

Declaring each domain's parameter list area separately means that each one will be mapped to a separate area of computer memory when the program executes. This will result in a larger program stack area and an increase in memory use. Overlaying the parameter list areas avoids this unnecessary extra storage requirement by reusing the same area in memory for each of the parameter lists.

Overlaid parameter lists are an efficient approach to better memory usage within a programming environment. However, a problem can occur when using overlaid parameter lists and not ensuring that their scope of reference is correctly managed within the source code.

Consider the case where a program invokes a call to 'domain 1'. The program sets up the parameters in a parameter list to invoke 'domain 1' in a shared memory area and calls 'domain 1'. When 'domain 1' has fulfilled its purpose, the flow of control of the overall program returns from 'domain 1' to the program. Logic is embedded within the program which can test fields, such as response and reason codes from 'domain 1' that have been set within the parameter list area and make run-time decisions based upon the results of the call.

However, there is no restriction on the program invoking another call (e.g., to 'domain 2') before testing the results from calling 'domain 1'. The program sets up the parameters to invoke 'domain 2' in the shared memory area. The program then calls 'domain 2'. When the flow of control of the program returns from 'domain 2' to the program, the logic can now test fields within the parameter list area as before, and make run-time decisions based upon the results of the call. The program logic tests the results of the call to 'domain 2', since the results are now held within the shared memory area. However, the program logic, in a different scenario, may decide to check the results of the earlier call to 'domain 1'. However, because this information is no longer held within the parameter list area of memory (because it has been overwritten by the results of 'domain 2'), the program logic is testing fields within the parameters set up for, or returned by, 'domain 2' as opposed to 'domain 1'. This can lead to logic errors at run-time because the shared memory area does not contain the correct information.

SUMMARY

According to exemplary embodiments, a method, system, and computer program product for identifying conflicting declared invalid runtime references of overlaid data structures of a shared memory area as declared in a program listing. The identifying includes identifying a first data structure and parameter list in the program listing. A first routine call and a first sequential flow of execution of the first routine call through the program listing in order to write data to the shared memory area are identified. A second data structure and a second parameter list in the program listing are identified. A second routine call and a second sequential flow of execution of the second routine call through the program listing in order to write data to the shared memory area are identified. It is determined whether the second routine call is attempting to overwrite data of the first routine call with the data of the second routine call in the shared memory area.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention

FIG. 4 is a block diagram illustrating a parameter listing as is known in the art;

DETAILED DESCRIPTION

Figure 1:
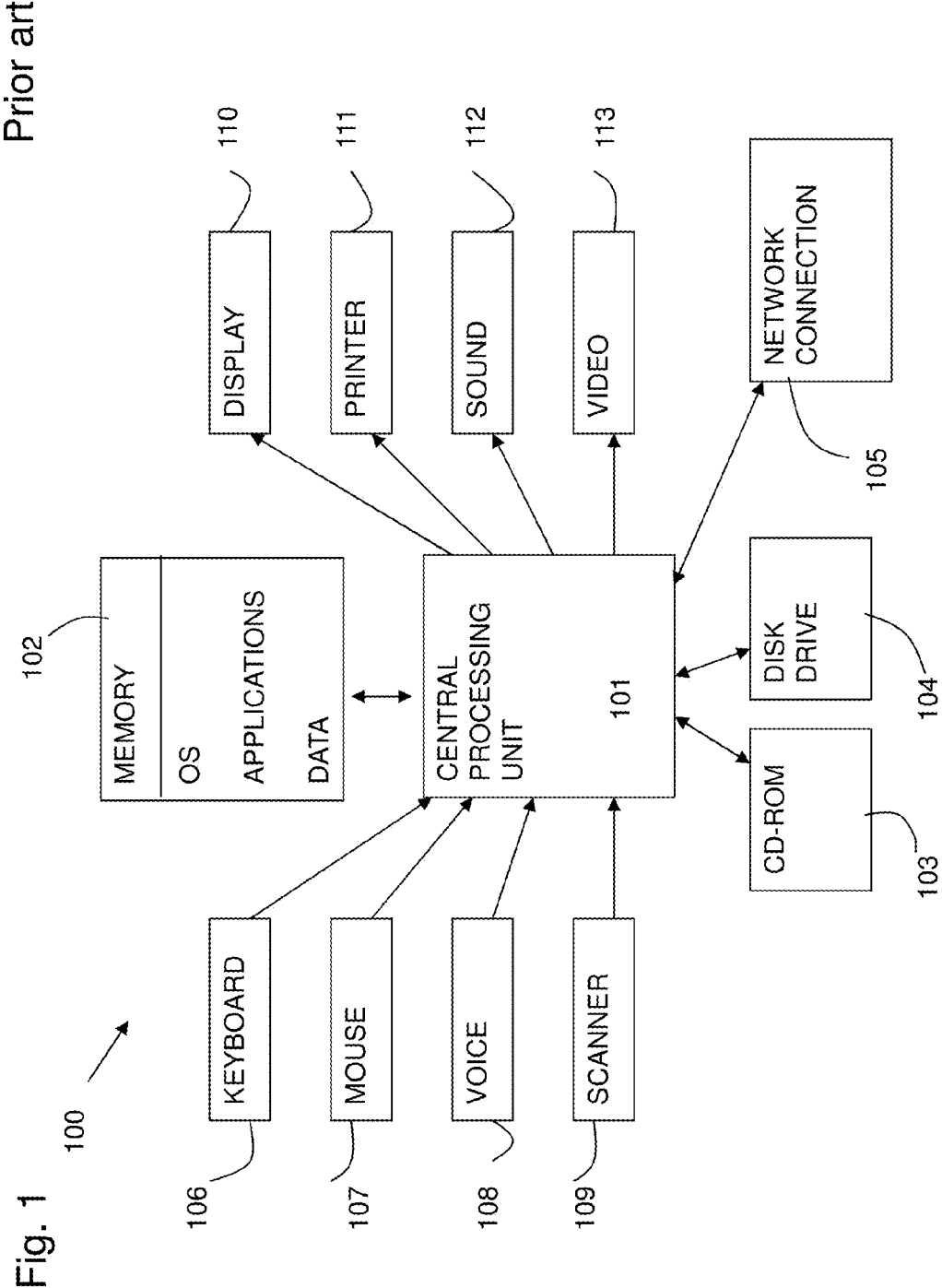
FIG. 1 is a prior art data processing system in which an embodiment of the present invention may be implemented.

Referring to FIG. 1, the data processing system 100 includes a central processing unit 101 with primary storage in the form of memory 102 (e.g., random access memory or "RAM", and read only memory or "ROM"). The memory 102 stores application information and data acted on or created by applications. The information includes the operating system code for the data processing system 100 and application code for applications running on the data processing system 100. Secondary storage includes, for example, optical disk storage 103 and magnetic disk storage 104. Data and application information can also be stored and accessed from the secondary storage.

The data processing system 100 includes a network connection means 105 for interfacing the data processing system 100 to a network. The data processing system 100 may also have other external source communication means such as a fax modem or telephone connection.

The central processing unit 101 includes inputs in the form of, as examples, a keyboard 106, a mouse 107, voice input 108, and a scanner 109 for inputting text, images, graphics or the like. Outputs from the central processing unit 101 may include a display 110, a printer 111, sound output 112, video output 113, etc.

Figure 2:
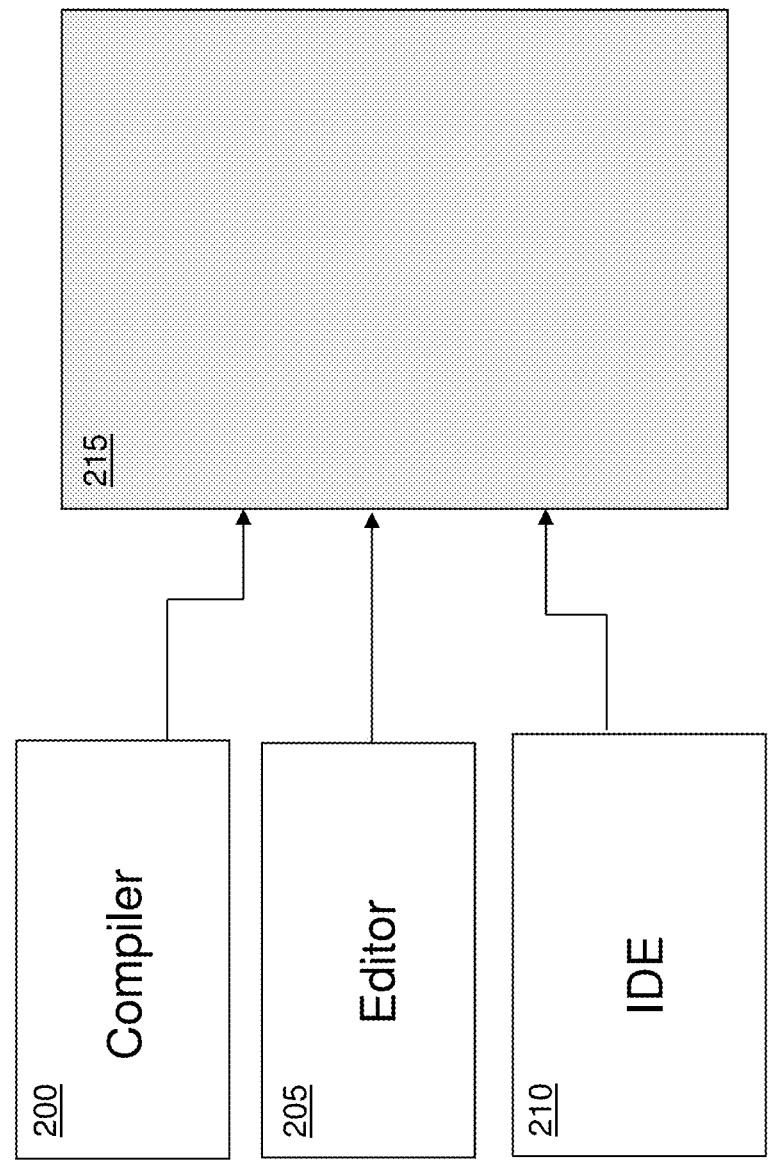
FIG. 2 is a block diagram depicting a validation component interfacing with a complier application, an integrated development environment or an editor, in accordance with an embodiment of the present invention.

With reference to FIG. 2 and in accordance with an embodiment of the present invention, a validation component 215 for validating runtime references is illustrated. The validation component 215 is operable for interfacing with a compiler 200, an editor 205 and/or an integrated development environment (IDE) 210. The validation component 215, in an exemplary embodiment, is a plug-in application operable with a compiler 200, an editor 205 or an IDE 210. Alternatively, the validation component 215 may be integrated into a compiler 200, an editor 205 or an IDE 210.

The validation component 215 may be initiated either by a command in the editor 205, compiler 200 or in the IDE 210. For clarity, these components will be termed the 'initiating application'.

The validation component 215 is triggered by receiving a request to analyze either source code or compiled code listings (program listings) from either of the initiating applications.

A person skilled in the art will understand that a program listing may include source code written in a specific programming language, object code generated by the compiler from the source code (but before linking). In addition, a program listing typically includes one or more data structures, including fields that are referenced by the program source code.

A person skilled in the art will also realize that the program listing may also include only the source code or any combination of the above.

Figure 3:
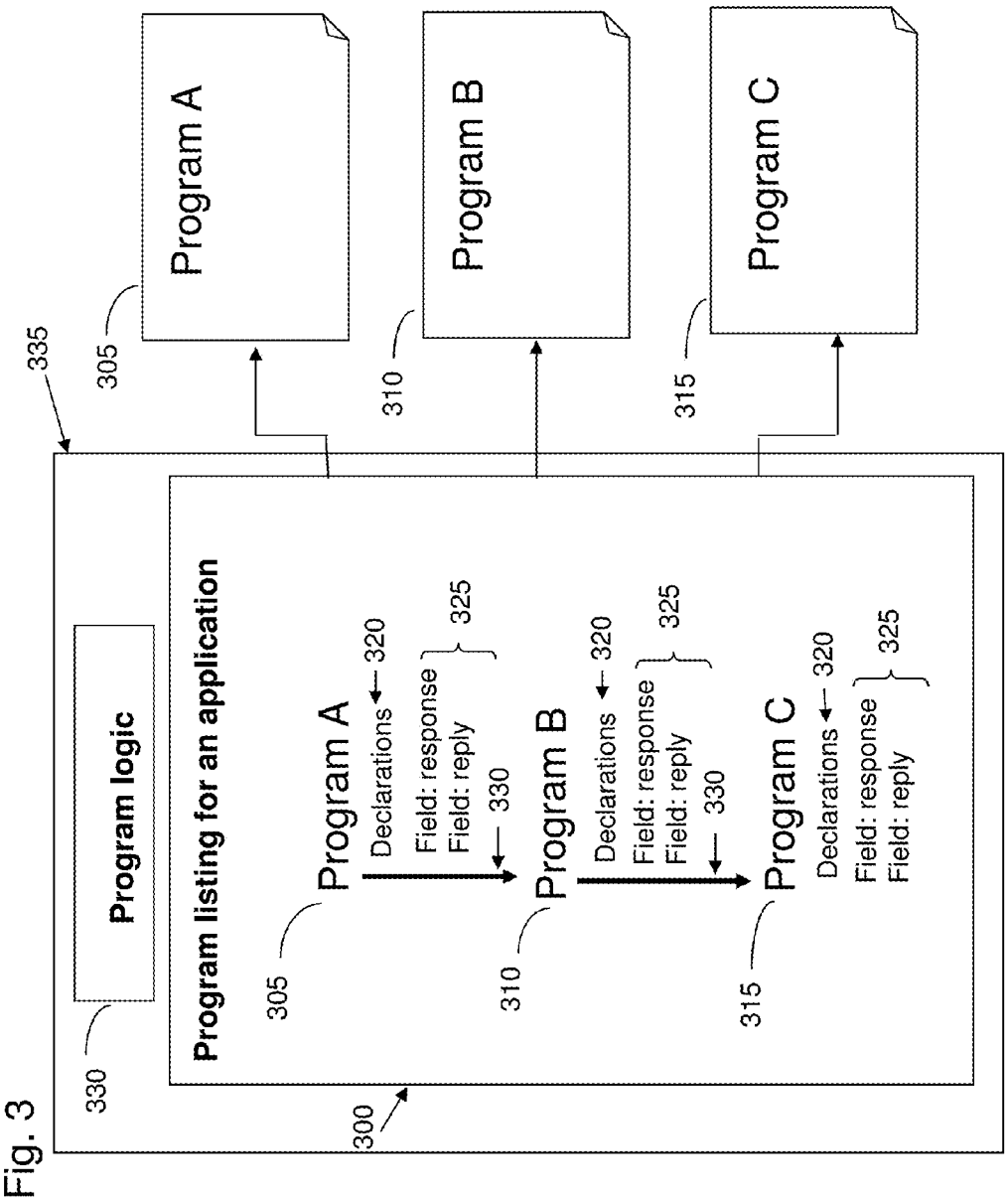
FIG. 3 is a block diagram illustrating a program listing including a plurality of programs in accordance with an embodiment of the present invention.

With reference to FIG. 3 and FIG. 4, a program listing 300 is illustrated. The program listing includes calls and declarations associated with a plurality of programs, namely 'program A' 305, 'program B' 310 and 'program C' 315. Each of the programs 305, 310, 315 operate together in order to provide the functionality of an application 335. The application 335 includes program logic 330 that enables a routine to be executed and other programs to be called in a particular order. For example, program logic 330 may dictate that 'program A' 305 is executed first, followed by 'program B' 310 and 'program C' 315. However, a person skilled in the art will realize that any order of program 305, 310, 315 execution may be possible depending of the functionality required by the application.

The application 335 includes a number of declarations 320, and within these declarations parameter lists are declared and set up at runtime prior to making a call to another program 305, 310, 315. FIG. 4, illustrates an example of a union of parameter lists 400.

An overlaid section of memory (shared memory) is declared with the name of 'xxyy_parms' 405. Within this declaration is a union of five parameter lists 410, reflecting that the application 335 which contains these declarations may make use of five different domain calls. Examples of parameter lists are 'apex_parms', 'lmlm_parms', 'meme_parms', etc. Each of these parameter lists will include response and reply fields 325 such as 'apex_response', 'apex_reason', 'lmlm_response', 'lmlm_reason', 'meme_response', 'meme_reason', etc. in order to test various responses in order to make certain runtime decisions.

Validation is performed in order to validate instances where references are being made to data structures in unioned storage areas after the contents of the unioned storage areas have been invalidated by an interleaving call to another program, using the same parameter list area within the program's working storage stack area.

Consider the following scenario relating to interleaved program calls to a lock domain and a storage domain, akin to calling 'Program A' 305, 'Program B' 310 or 'Program C' 315. When an application 335 needs to acquire some storage from the storage domain, which can take a considerable amount of time (in computing terms), the application 335 cannot hold a resource lock across the call as this could severely impact system performance. Therefore, the program logic calls the lock domain to release the lock (it sets up the 'lmlm_parms' and makes the call). The lock domain populates the response and reason codes into the parameter list area ready for inspection by the calling application 335.

The program logic 330 tests the results of the call to the lock domain. If successful, the program logic 330 calls the storage domain to acquire the storage. The program logic 330 sets up the 'smmc_parms' and makes the call. The storage domain acquires the storage and populates the response and reason codes in the reply fields 325 into the parameter list area ready for inspection by the calling application 335.

The program logic 330 needs to reacquire the resource lock that it had to release around the call to acquire the storage. It sets up the 'lmlm_parms' and then calls the lock domain. The lock domain reacquires the lock and populates the response and reason codes into the parameter list area ready for inspection by the calling program. In doing so, the 'smmc_parms' is overlaid and the data is now lost. This includes the response and reason codes from the storage domain call.

Upon returning control back to the application 335, the program logic 330 now checks the response and reason codes in the reply fields 325 from the storage domain. However, this information has been lost since the parameter list storage has been reused by the call to the lock domain. Unpredictable run-time results may now occur, because the storage areas and program behaviour are no longer defined.

In order to detect and avoid this problem, in accordance with an exemplary embodiment of the present invention, the validation component 215 detects and validates the runtime references to determine whether there is an error in the program logic 330 flow, such that, the area of shared memory is overlaid with incorrect memory references. The validation component 215 includes a number of sub components. These are a receiving component 500, a parsing component 505, a mapping component 510, an analysis component 530, a rendering component 515, a historical component 520 and a metadata storage area 525.

Figure 5:
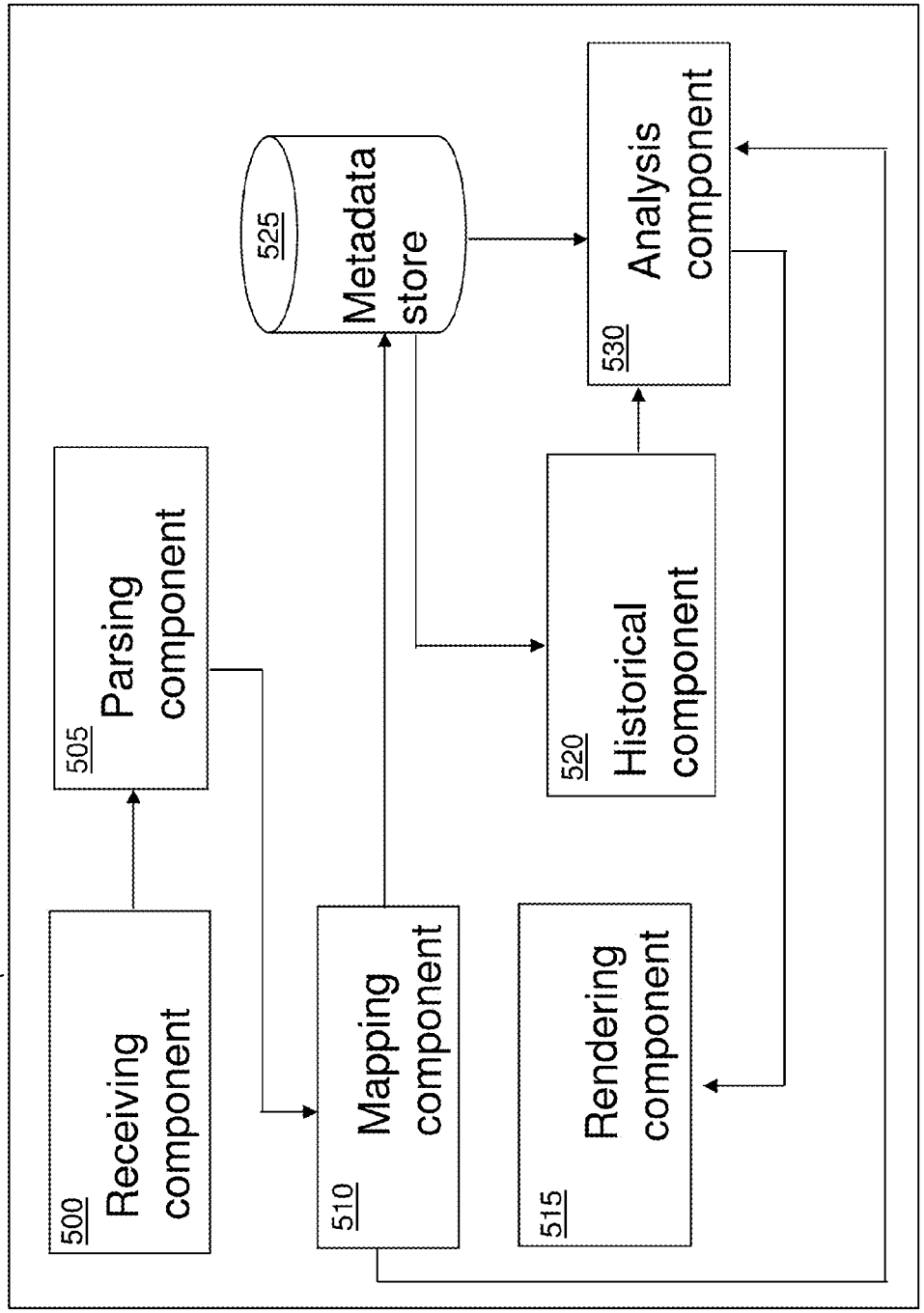
FIG. 5 is a block diagram illustrating the sub components of the validation component of FIG. 2 in accordance with an embodiment of the present invention.
Figure 6:
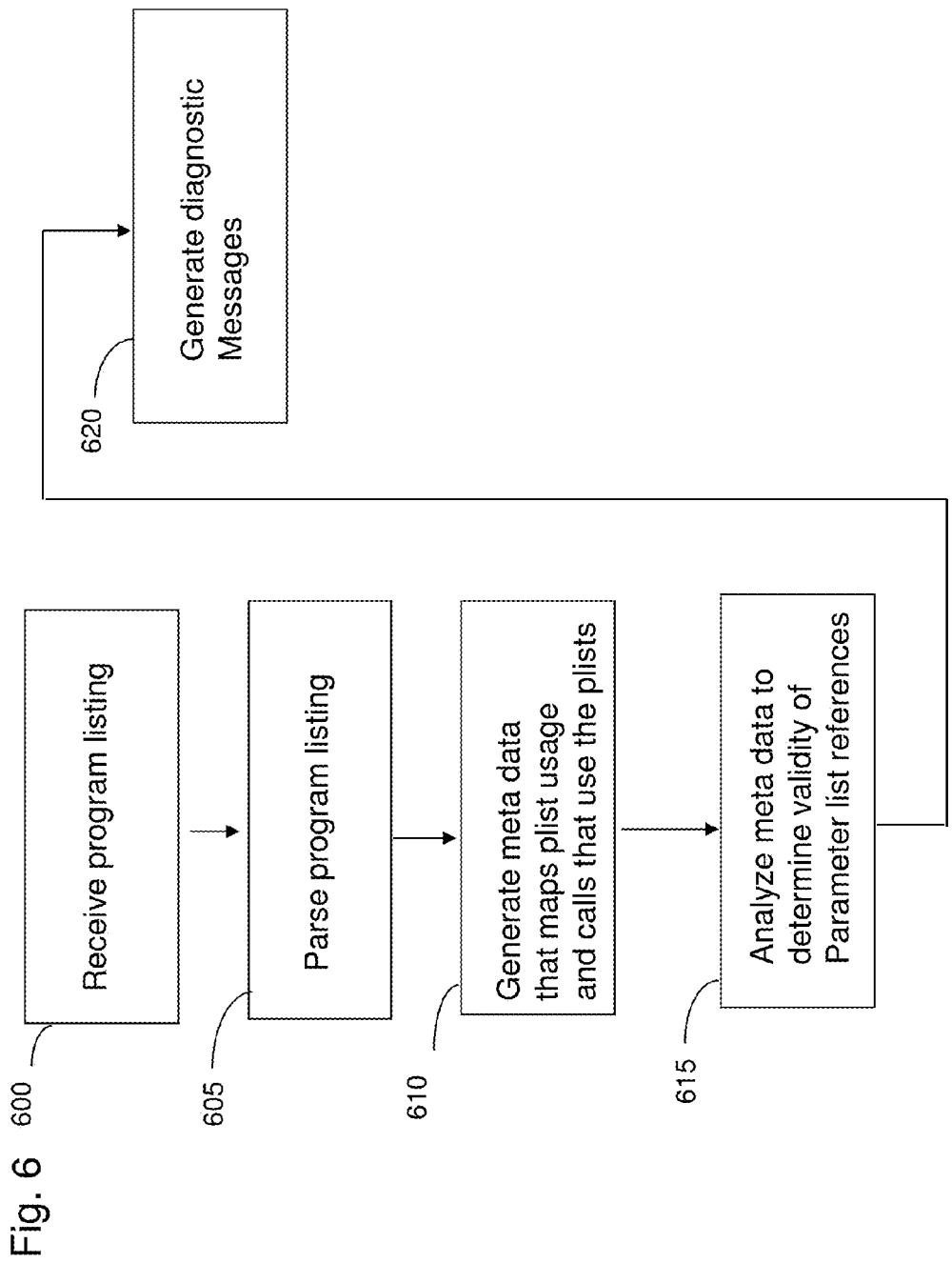
FIGS. 6 and 7 are flow diagrams illustrating the process flow of the validation component in accordance with an embodiment of the present invention.
Figure 7:
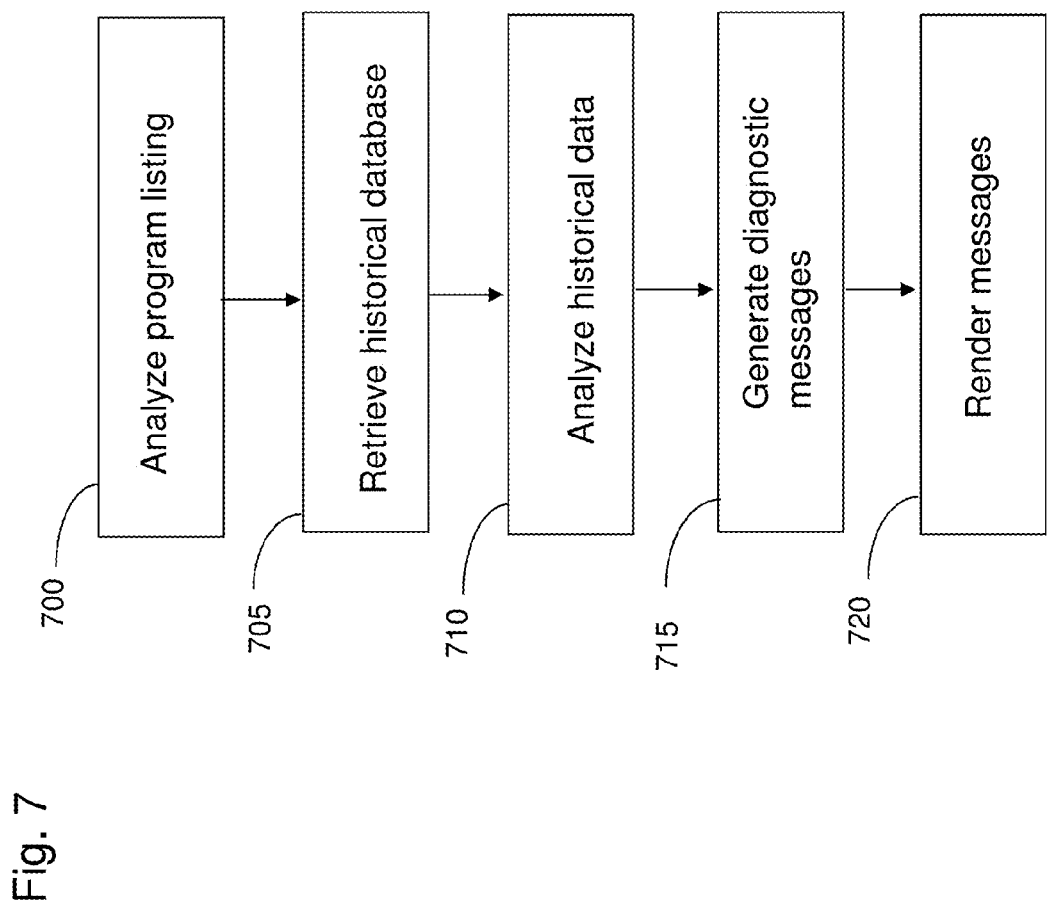

The process by which the sub components of the validation component 215 operate together in accordance with an embodiment of the present invention is presented below by way of an example and with reference to FIGS. 5, 6 and 7.

The receiving component 500 receives a program listing 300 from the application. The receiving component 500 transmits the received program listing to the parsing component 505 for further processing (block 600).

The parsing component 505 scans the program listing in order to identify one or more parameter declarations that are identified as overlaying each other and also identifies each of the runtime calls within the program listing that make reference to each of the data fields within the parameter lists. The parsing component 505 communicates the identified parameter declarations and each of the identified data fields to the mapping component 510 for further processing (block 605).

The mapping component 510 analyzes the received data and maps each of the identified calls and their sequential flow of execution within the source code, as metadata state. The metadata is stored in a metadata storage area 525. The mapping component 510 also maps the references to the parameter list fields as metadata (block 610). From the example of FIG. 4, the following mapping would take place as the program logic flow was parsed and presented to the mapping component 510.

In the example given earlier, the program logic notes that the parameter list storage is currently 'in use' by the fact that a call to a lock domain has been requested, when the program logic sets up the parameter list for the call to the lock domain and issues the call.

Each time the program logic identifies that a call to a domain is 'in use' this is set as a state in metadata, an example (Example 1) is as follows:

EXAMPLE 1

SET lmlm_parms_in_scope to TRUE
SET lock_domain_being_called to TRUE

The metadata may also include other data that associates the data with the above state transitions to particular source code lines within the program listing, and to their execution point within the program logic, such as within a called subroutine or function.

The program listing 300 continues to be parsed. The mapping component 510 notes that the parameter list storage is no longer of interest by the fact that the lock domain response and reason fields have been tested for and resultant code paths defined. The program logic checks the response and reason codes from the lock domain, and exits the program if an error has occurred as follows (Example 2):

EXAMPLE 2

SET lock_domain_being_called to FALSE
SET lmlm_parms_in_scope to FALSE

The program listing continues to be parsed. The program logic calls the storage domain to acquire the storage. It sets up the 'smmc_parms' and makes the call. The storage domain acquires the storage lock and populates its response and reason codes into the parameter list area ready for inspection by the calling program.

The mapping component 510 represents this by updating its metadata for the state of the program's shared parameter list storage and its call to the storage domain, as follows (Example 3):

EXAMPLE 3

SET smmc_parms_in_scope to TRUE
SET storage_domain_being_called to TRUE
SET storage_domain_being_called to FALSE
SET smmc_parms_in_scope to FALSE The program logic 330 now needs to reacquire the resource lock, therefore it sets up the 'lmlm_parms' parameter information and makes the call to the lock domain. The lock is reacquired, and the lock domain populates the response and reason codes into the parameter list area ready for inspection by the calling application.

In doing so, the 'smmc_parms' are overlaid and their data is now lost. This includes the response and reason codes from the storage domain call.

The mapping component 510 represents this by updating its metadata for the state of the program's shared parameter list storage and call to the lock domain, as follows (Example 4):

EXAMPLE 4

SET lmlm_parms_in_scope to TRUE
SET lock_domain_being_called to TRUE
SET lock_domain_being_called to FALSE The program logic 330 may now erroneously check the response and reason codes from the storage domain call made earlier. However, this information has been lost since the parameter list storage has been reused by the call to the lock domain. When the instructions that test the smmc_parm fields are parsed by an embodiment of the invention, the mapping component 510 now records the fact as follows (Example 5):

EXAMPLE 5

SET invalid_reference_to_smmc_parms to TRUE

The remainder of the program logic 330 is parsed, and additional metadata is created by the mapping component 510 to reflect the application's other usage of domain calls and their parameter list contents, as appropriate.

Having parsed the entire program listing, the mapping component 510 having completed the mapping and created the metadata, passes control to the analysis component 530.

The analysis component 530 accesses the metadata and analyzes the metadata created by the mapping of the program listing 300. The analysis component 530 determines which calls were invalidly making reference to parameter list fields that were no longer within their specific scope (block 615) by referencing the program logic and the status of a call as described by the metadata.

By way of the examples 1 through to 5 above, the analysis component may note that the application had made reference to the content of 'smmc_parms' after the shared parameter list area had been reused by an interleaving call to the lock domain.

The analysis component 530 determines this by analyzing the metadata which describes the flow of events within the program logic, and the various state flags (Boolean and otherwise) that are set when the application was parsed. In the example above, these may include the flags 'smmc_parms_in_scope' being set to false, and 'invalid_reference_to_smmc_parms' being set to true. This would confirm that a reference had been made to shared storage that no longer contained the 'smmc_parms' information. The content of the 'lmlm_parms_in_scope' and 'lock_domain_being_called' Boolean settings confirms the type of interleaved call which had invalidated the content of the shared parameter list storage.

The metadata also includes concomitant data reflecting the source instructions statement number within the program listing, and their execution order within the flow of control of the program. The analysis component 530 analyzes this information in order to identify one or more invalid calls, where data has been overlaid in the shared memory area.

The analysis component 530 compiles a result set and passes the result set to a rendering component 515, which generates warning and/or error messages appropriate to the issues identified by the analysis component 530 (block 620). If, for example, and with reference to example, invalid referencing of the 'smmc_response' and 'smmc_reason' fields was detected, the rendering component 515 is notified of this, along with the instruction context in relation to the program itself. An example of messages for such a scenario follows (Example 6):

EXAMPLE 6

Analysis of target program ABCD performed at yy/mm/dd, hh/mm/ss

Reference to following invalidated fields detected:

Field: smmc_response. Sequence number: 1234. Subroutine get_stg.

Field: smmc_reason. Sequence number 1237. Subroutine get_stg.

Fields invalidated by earlier call to lock manager component.

The messages would be rendered as appropriate for their output destination, such as line output within an edit screen or compiler listing, or as a diagnostic within a pane in an IDE.

In another embodiment, the analysis component 530 accesses historical metadata captured by a historical component 520 for future use (block 700 and 705). The historical component 520 continuously captures error situations involving a combination of programming calls to other programs and parameter list references. An error situation is one identified by the analysis component 530 once the mapping process has been completed (block 710). The captured historical data allows for the capture of typical error situations involving combinations of programming calls and parameter list references. Such historical data may be available to the analysis component 530, when analyzing metadata for future program listings.

The analysis component 530 can check for similarities of such combinations within the state transitions reflected by the metadata under analysis, and look for situations where such errors could potentially be seen in the program under analysis, if for example, logic changes were made which might affect the flow of events within the program logic around the area of a domain call, or insertion of particular instructions or subroutine invocations between a domain call and a validation of its result were made. The analysis component 530 may then warn of this by generating appropriate message data (blocks 715 and 720), for example in a case where calls to unlock and lock a resource were not currently present within the program being analyzed as follows (Example 7):

EXAMPLE 7

Analysis of target program WXYZ performed at yy/mm/dd, hh/mm/ss.

Reference to following fields detected:

Field: smmc_response. Sequence number: 5678. Subroutine get_stg.

Field: smmc_reason. Sequence number 5679. Subroutine get_stg.

"Please be aware of the effect of adding calls to unlock and lock resources around this get storage operation. The 'smmc' and 'lmlm' parameter list areas are declared in a union, so overlay each other. Reference to the 'smmc_response' and 'smmc_reason' fields would become invalidated by the addition of an earlier call to the lock manager component, which is a typical operation to perform."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An embodiment of the invention can take the form of an entirely hardware embodiment, an entirely software embodiment or an embodiment containing both hardware and software elements. In an exemplary embodiment of the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method comprising:
identifying, by a processor, conflicting declared invalid runtime references of overlaid data structures of a shared memory area as declared in a program listing of an application, the identifying conflicting declared invalid runtime references comprising:

identifying a first data structure and a first parameter list in the program listing;

responsive to identifying the first data structure and the first parameter list in the program listing, identifying a first routine call and a sequential flow of execution of the first routine call through the program listing in order to write data to the shared memory area;

identifying a second data structure and a second parameter list in the program listing;

responsive to identifying the second data structure and the second parameter list in the program listing, identifying a second routine call and a sequential flow of execution by the second routine call through the program listing in order to write data to the shared memory area; and determining whether execution of the application will cause the application to attempt to access content of the first parameter list from the shared memory area after the shared memory area has been overlaid with content of the second parameter list, wherein the determination is based on the sequential flow of execution of the first and second routine calls, and wherein the sequential flow of execution is determined by analyzing the program listing.

2. A method as claimed in claim 1 wherein the identifying conflicting declared invalid runtime references further comprises analyzing the first data structure and the first parameter list in order to generate a first metadata state which maps a flow of execution of the first routine call as the first routine call requests access to one or more domains.

3. A method as claimed in claim 2 wherein the one or more domains comprise a resource that the first routine call requires access to.

4. A method as claimed in claim 2 wherein the identifying conflicting declared invalid runtime references further comprises analyzing the second data structure and the second parameter list in order to generate a second metadata state which maps a flow of execution of the second routine call as the second routine call requests access to one or more domains.

5. A method as claimed in claim 4 wherein the analyzing the second identified data structure and the second parameter list comprises: analyzing the first metadata state and analyzing the second metadata state to determine whether the first metadata state conflicts with the second metadata state.

6. A method as claimed in claim 5 wherein the identifying conflicting declared invalid runtime references further comprises generating historical rule data responsive to the determining whether the first metadata state conflicts with the second metadata state.

7. The method of claim 1, further comprising generating an error message based on determining that execution of the application will cause the application to attempt to access content of the first parameter list from the shared memory area after the shared memory has been overlaid with content of the second parameter list.

8. An apparatus comprising:
a processor configured for:
identifying conflicting declared invalid runtime references of overlaid data structures of a shared memory area as declared in a program listing of an application, the identifying conflicting declared invalid runtime references comprising:
identifying a first data structure and a first parameter list in the program listing;
responsive to identifying the first data structure and the first parameter list in the program listing, identifying a first routine call and a sequential flow of execution of the first routine call through the program listing in order to write data to the shared memory area;
identifying a second data structure and a second parameter list in the program listing;
responsive to identifying the second data structure and the second parameter list in the program listing, identifying a second routine call and a sequential flow of execution by the second routine call through the program listing in order to write data to the shared memory area; and
determining whether execution of the application will cause the application to attempt to access content of the first parameter list from the shared memory area after the shared memory area has been overlaid with content of the second parameter list, wherein the determination is based on the sequential flow of execution of the first and second routine calls, and wherein the sequential flow of execution is determined by analyzing the program listing.

9. An apparatus as claimed in claim 8 wherein the identifying conflicting declared invalid runtime references further comprises analyzing the first data structure and the first parameter list in order to generate a first metadata state which maps a flow of execution of the first routine call as the first routine call requests access to one or more domains.

10. An apparatus as claimed in claim 9 wherein the one or more domains comprise a resource that the first routine call requires access to.

11. An apparatus as claimed in claim 9 wherein the identifying conflicting declared invalid runtime references comprising further comprises analyzing the second data structure and the second parameter list in order to generate a second metadata state which maps a flow of execution of the second routine call as the second routine call requests access to one or more domains.

12. An apparatus as claimed in claim 11 wherein the analyzing the second data structure and the second parameter list comprises: analyzing the first metadata state and analyzing the second metadata state to determine whether the first metadata state conflicts with the second metadata state.

13. An apparatus as claimed in claim 12 wherein the identifying conflicting declared invalid runtime references further comprises generating historical rule data responsive to the determining whether the first metadata state conflicts with the second metadata state.

14. The apparatus method of claim 8, wherein the processor is further configured for generating an error message based on determining that execution of the application will cause the application to attempt to access content of the first parameter list from the shared memory area after the shared memory has been overlaid with content of the second parameter list.

15. A computer program comprising a non-transitory computer readable storage medium having computer readable program code embodied therewith, the computer readable program code comprising:
computer readable program code configured for:
identifying conflicting declared invalid runtime references of overlaid data structures of a shared memory area as declared in a program listing of an application, the identifying conflicting declared invalid runtime references comprising:
identifying a first data structure and a first parameter list in the program listing;
responsive to identifying the first data structure and the parameter list in the program listing, identifying a first routine call and a sequential flow of execution of the first routine call through the program listing in order to write data to the shared memory area;

identifying a second data structure and a second parameter list in the program listing;

responsive to identifying a second data structure and the second parameter list in the program listing, identifying a second routine call and a sequential flow of execution by the second routine call through the program listing in order to write data to the shared memory area; and determining whether execution of the application will cause the application to attempt to access content of the first parameter list from the shared memory area after the shared memory area has been overlaid with content of the second parameter list, wherein the determination is based on the sequential flow of execution of the first and second routine calls, and wherein the sequential flow of execution is determined by analyzing the program listing.

16. A computer program as claimed in claim 15 wherein the identifying conflicting declared invalid runtime references further comprises analyzing the first data structure and the first parameter list in order to generate a first metadata state which maps a flow of execution of the first routine call as the first routine call requests access to one or more domains.

17. A computer program as claimed in claim 16 wherein the one or more domains comprise a resource that the first routine call requires access to.

18. A computer program as claimed in claim 16 wherein the identifying conflicting declared invalid runtime references comprising further comprises analyzing the second data structure and the second parameter list in order to generate a second metadata state which maps a flow of execution of the second routine call as the second routine call requests access to one or more domains.

19. A computer program as claimed in claim 18 wherein the analyzing the second data structure and the second parameter list comprises: analyzing the first metadata state and analyzing the second metadata state to determine whether the first metadata state conflicts with the second metadata state.

20. The computer program product of claim 15, wherein the computer program code is further configured for generating an error message based on determining that execution of the application will cause the application to attempt to access content of the first parameter list from the shared memory area after the shared memory has been overlaid with content of the second parameter list.

* * * * *